US009805272B1

(12) United States Patent
Chen

(10) Patent No.: US 9,805,272 B1
(45) Date of Patent: Oct. 31, 2017

(54) STORAGE SYSTEM OF ORIGINAL FRAME OF MONITOR DATA AND STORAGE METHOD THEREOF

(71) Applicant: QNAP SYSTEMS, INC., New Taipei (TW)

(72) Inventor: Chun-Yen Chen, New Taipei (TW)

(73) Assignee: QNAP Systems, Inc., New Taipei (TW)

( * ) Notice: Subject to any disclaimer, the term of this patent is extended or adjusted under 35 U.S.C. 154(b) by 0 days.

(21) Appl. No.: 15/233,962

(22) Filed: Aug. 11, 2016

(30) Foreign Application Priority Data

Jun. 7, 2016 (TW) .............................. 105118004 A

(51) Int. Cl.
*H04N 9/80* (2006.01)
*H04N 5/93* (2006.01)
*G06K 9/00* (2006.01)
*H04N 5/915* (2006.01)

(52) U.S. Cl.
CPC ..... *G06K 9/00771* (2013.01); *G06K 9/00744* (2013.01); *H04N 5/915* (2013.01); *G06K 2009/00738* (2013.01)

(58) Field of Classification Search
CPC ........... G06K 9/00771; G06K 9/00744; G06K 2009/00738; H04N 5/915
USPC ........................ 386/241, 248, 278, 281, 326
See application file for complete search history.

(56) References Cited

U.S. PATENT DOCUMENTS

| 6,813,312 B2 | 11/2004 | Tullberg et al. |
| 9,094,615 B2* | 7/2015 | Aman .................... G01S 3/7864 |
| 2010/0053429 A1* | 3/2010 | Miyazaki ............... H04N 7/014 |
| | | 348/513 |

FOREIGN PATENT DOCUMENTS

TW     201328358     7/2013

OTHER PUBLICATIONS

"Office Action of Taiwan Counterpart Application", dated Dec. 19, 2016, p. 1-p. 5.

* cited by examiner

*Primary Examiner* — Robert Chevalier
(74) *Attorney, Agent, or Firm* — JCIPRNET

(57) ABSTRACT

A storage system of original frames of monitor data and a storage method thereof are provided. The storage system includes a monitor sensor, an event marking circuit, a data storage circuit and a frame processing circuit. The monitor sensor provides a plurality of original frames. The event marking circuit has an input terminal coupling to the monitor sensor and an output terminal, and is used for determining an event intensity of a corresponding one of the original frames and marks the event intensity on the corresponding original frame. The data storage circuit is coupled to the output terminal and is used for completely storing the original frames. The frame processing circuit is coupled to the data storage circuit and is used for checking whether the original frames within the data storage circuit are deleted according to the event intensities.

20 Claims, 4 Drawing Sheets

STORAGE SYSTEM OF ORIGINAL FRAME OF MONITOR DATA AND STORAGE METHOD THEREOF

CROSS-REFERENCE TO RELATED APPLICATION

This application claims the priority benefit of Taiwan application serial no. 105118004, filed on Jun. 7, 2016. The entirety of the above-mentioned patent application is hereby incorporated by reference herein and made a part of this specification.

BACKGROUND OF THE INVENTION

Field of the Invention

The invention relates to a frame storage system, and particularly relates to a storage system of original frame of monitor data and a storage method thereof.

Description of Related Art

Along with development of technology, people try to create a safe living environment through various methods, so that monitoring systems are gradually applied in daily life. Monitor camera is generally applied in the monitoring system due to its small volume, and is generally set up at a higher place to monitor images of different angles, and the images are recorded to facilitate later access. In order to restore an event site in case of occurrence of an event, monitor data is generally preserved for a long time. However, limited by a capacity of a storage medium, old monitor data is probably deleted directly, such that the event cannot be restored. Therefore, how to preserve useful image data as far as possible in case of limited capacity becomes an important issue in storage of monitor data.

SUMMARY OF THE INVENTION

The invention is directed to a storage system of original frame of monitor data and a storage method thereof, which saving the storage capacity of the monitor frames and preserving effectiveness of the monitor frames in law.

The invention provides a storage system of original frames of monitor data including a monitor sensor, an event marking circuit, a data storage circuit and a frame processing circuit. The monitor sensor provides a plurality of original frames. The event marking circuit has an input terminal coupled to the monitor sensor, and is used for determining event intensities respectively corresponding to the original frames provided by the monitor sensor, and respectively marks the event intensities on the original frames. The data storage circuit is coupled to an output terminal of the event marking circuit, and is used for completely storing the original frames marked by the event marking circuit. The frame processing circuit is coupled to the data storage circuit, and is used for checking the original frames in the data storage circuit according to the event intensities. Regarding a plurality of first original frames that the original frames with an existing time falling within a first time section, the frame processing circuit preserves the original frames having an event occurred in the first original frames, and deletes other original frames in the first original frames. Regarding a plurality of second original frames that the original frames with the existing time falling within a second time section, the frame processing circuit preserves the original frames with higher event intensities in the second original frames, and deletes other original frames in the second original frames.

The invention provides a storage method of original frames of monitor data, which includes following steps. A plurality of original frames is obtained through a monitor sensor. The original frames are completely stored in a data storage circuit. Regarding a plurality of first original frames that the original frames with an existing time falling within a first time section, the original frames having an event occurred in the first original frames are preserved by a frame processing circuit, and other original frames in the first original frames are deleted. Regarding a plurality of second original frames that the original frames with the existing time falling within a second time section, event intensities respectively corresponding to the second original frames are determined by an event marking circuit, and the original frames with higher event intensities in the second original frames are preserved by the frame processing circuit, and other original frames in the second original frames are deleted.

According to the above descriptions, in the storage system of original frame of monitor data and a storage method thereof of the invention, the storage system of original frame of monitor data determines a preserving time of each original frame according to event intensities of the original frames, and deletes the unreserved original frames in the corresponding time section. In this way, the storage capacity of the monitor frames is saved, and effectiveness of the monitor frames in law is preserved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
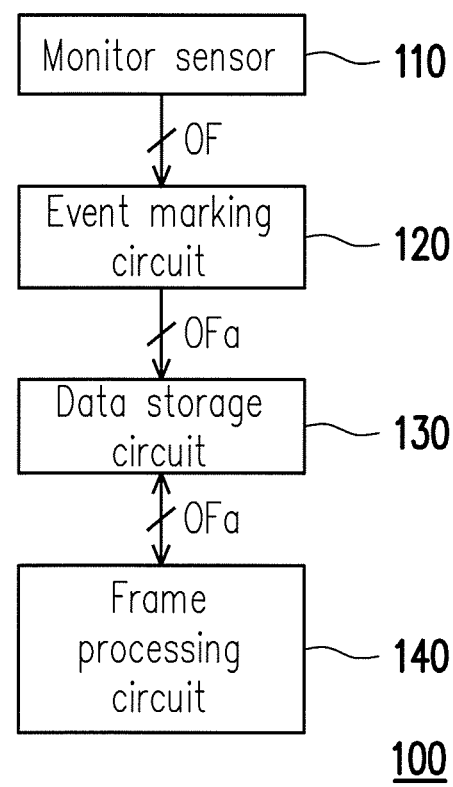
FIG. 1 is a system schematic diagram of a storage system of original frame of monitor data according to an embodiment of the invention.

FIG. 1 is a system schematic diagram of a storage system of original frame of monitor data according to an embodiment of the invention. Referring to FIG. 1, in the present embodiment, the storage system of original frame of monitor data 100 includes a monitor sensor 110, an event marking circuit 120, a data storage circuit 130 and a frame processing circuit 140. The monitor sensor 110 is, for example, a camera or a similar device, the data storage circuit 130 is, for example, a data storage device (for example, a hard disk system), and the frame processing circuit 140 is, for example, an image processing device (for example, an image card). Moreover, the monitor sensor 110 is used for monitoring a specific region (for example, an aisle, an entrance/exit) to provide a plurality of original frames OF.

The event marking circuit 120 has an input terminal coupled to the monitor sensor 110, and is used for determining event intensities respectively corresponding to the original frames OF provided by the monitor sensor 110, and respectively marks the event intensities on the original frames OF to provide marked original frames OFa, where the event intensities of the original frames OF are related to image content and non-related to time. For example, the event marking circuit 120 may determine whether the original frames OF include an event, and determine whether the original frames OF including the event are key frames or necessary key frames, and then marks the original frames OF according to a determination result. Since the marks of the original frames OF represent correlation degrees between the original frames OF and a specific event, the aforementioned marking method is to respectively mark the event intensities on the original frames OF. Moreover, besides that the original frames OF are marked through image recognition, the original frames OF can also be marked through manual inspection, which is not limited by the invention.

The data storage circuit 130 is coupled to an output terminal of the event marking circuit 120, and is used for completely storing the original frames marked by the event marking circuit 120. The frame processing circuit 140 is coupled to the data storage circuit 130, and is used for checking the original frames OFa in the data storage circuit 120 according to the event intensities of the original frames OFa, and determines the original frames OFa to be preserved in different time sections, where the more later the time section is, the less the original frames OFa are preserved.

Figure 2:
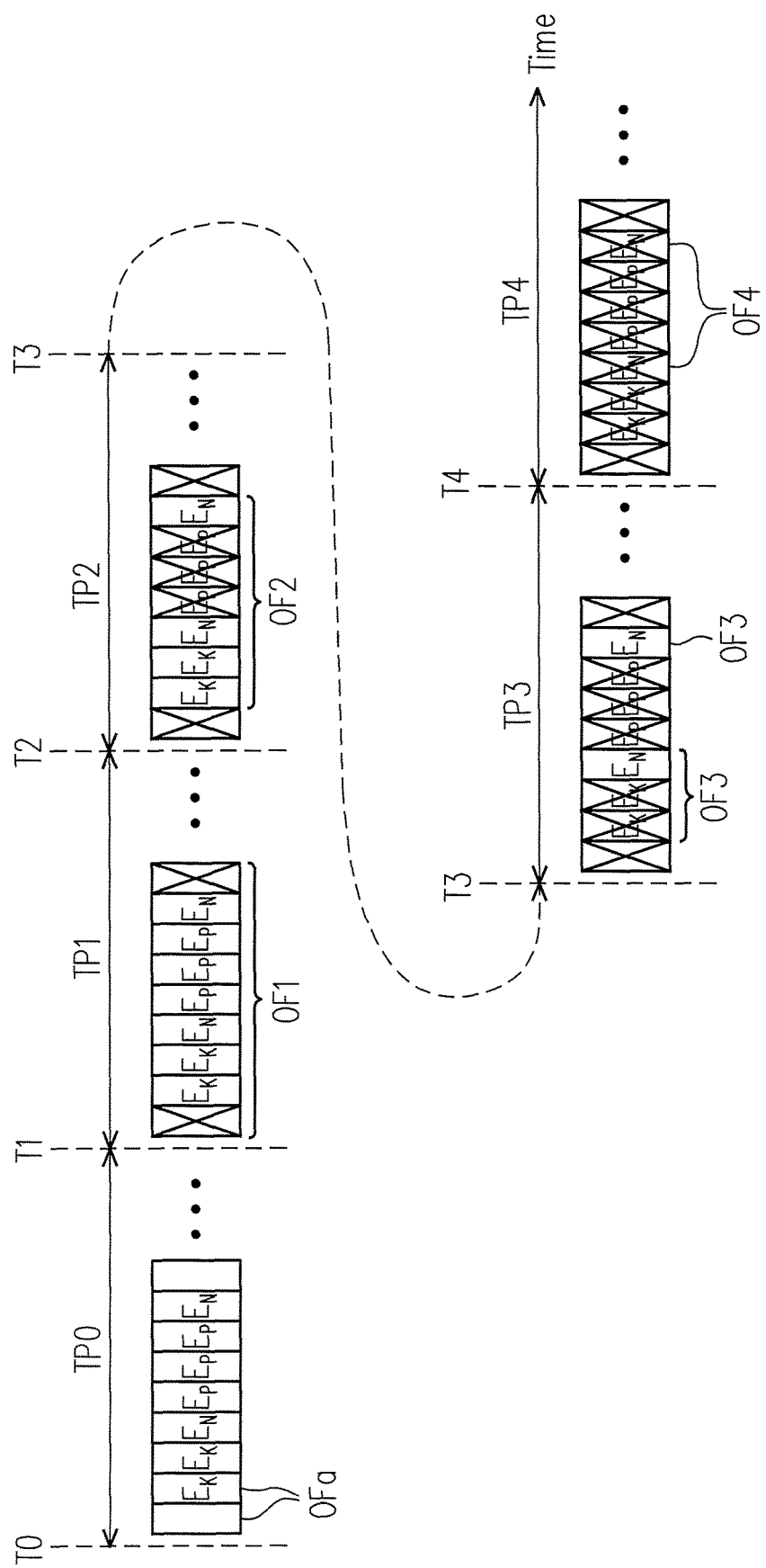
FIG. 2 is a timing diagram of a storage method of original frame of monitor data according to an embodiment of the invention.

FIG. 2 is a timing diagram of a storage method of original frame of monitor data according to an embodiment of the invention. Referring to FIG. 1 and FIG. 2, in the present embodiment, existing times of the original frames OFa are divided into five time sections, i.e. time sections TP0-TP4, where the time section TP0 is located between a time point T0 and a time point T1, the time section TP1 is located between the time point T1 and a time point T2, the time section TP2 is located between the time point T2 and a time point T3, the time section TP3 is located between the time point T3 and a time point T4, and the time section TP4 is located behind the time point T4, and the time points T0-T4 are arranged from earlier to later.

Regarding the original frames OFa with the existing time falling within the time section TP0, the processing circuit 140 does not process the original frames OFa (i.e. does not delete any original frame OFa), so that the original frames OFa within the time section TP0 are completely preserved. For example, the original frames OFa within the time section TP0 include event-occurring frames (for example, frames marked as $E_P$, $E_K$ and $E_N$) and no-event frames (for example, frames that are not marked), and within the time section TP0, the event-occurring frames and the no-event frames are all preserved.

Regarding a plurality of first original frames OF1 (i.e. frames marked as $E_P$, $E_K$ and $E_N$ and frames that are not marked) that the original frames OFa with the existing times falling within the time section TP1 (corresponding to a first time section), the first original frames OF1 having an event occurred in the first original frames (for example, the frames marked as $E_P$, $E_K$ and $E_N$) are preserved, and other non-preserved original frames OF1 (for example, the frames that are not marked) are deleted. The aforementioned event is, for example, object moving, flame or smoke appearing, etc.

Regarding a plurality of second original frames OF2 (i.e. frames marked as $E_P$, $E_K$ and $E_N$) that the original frames OFa with the existing times falling within the time section TP2 (corresponding to a second time section), the original frames OF2 with higher event intensities in the second original frames OF2 are preserved, and other non-preserved original frames OF2 are deleted. For example, the second original frames OF2 include a plurality of general frames (for example, frames marked as $E_P$, which are, for example, back images of pedestrians) a plurality of key frames (for example, frames marked as $E_K$, which are, for example, license plates or human faces in the frames) and a plurality of necessary key frames (for example, frames marked as $E_N$, which, for example, correspond to a flame event and 10 seconds continuous frames before and after the event) corresponding to an event, and the frame processing circuit 140 preserves the key frames $E_K$ and the necessary key frames $E_N$ corresponding to higher event intensities in the second original frames OF2, and deletes the other second original frames OF2, i.e. deletes the general frames $E_P$ of the event.

Regarding a plurality of third original frames OF3 (i.e. frames marked as $E_K$ and $E_N$) that the original frames OFa with the existing times falling within the time section TP3 (corresponding to a third time section), the frame processing circuit 140 preserves the necessary key frames $E_N$ of the third original frames OF3, and deletes the key frames $E_K$ of the third original frames OF3. Regarding a plurality of fourth original frames OF4 (i.e. frames marked as $E_N$) that the original frames OFa with the existing times falling within the time section TP4 (corresponding to a fourth time section), the frame processing circuit 140 deletes all of the fourth original images OF4.

Further, the event intensity of the necessary key frames is higher than the event intensity of the non-necessary key frames (i.e. the general frames and the key frames). Therefore, the frame processing circuit 140 preserves all of the necessary key frames $E_N$ in the second original frames OF2, and selectively preserves all of or a part of the key frames $E_K$ in the second original frames OF2, and deletes all of the general frames $E_P$.

In an embodiment of the invention, filter of the key frames $E_K$ can be performed according to time, i.e. a frame rate of the key frames $E_K$ is set; alternatively, the event intensities of the key frames can be compared to preserve the key frames $E_K$ with higher event intensity. Moreover, the event intensities of the key frames $E_K$ can be proportional to a proportion of a moving object in the corresponding second original frames OF2.

In an embodiment of the invention, the necessary key frames $E_N$ are, for example, the second original frames OF2 including a distinguishing feature of a moving object, and the key frames $E_K$ are, for example, the second original frames OF2 including the moving object without including the distinguishing feature. When the moving object is an animal, the aforementioned distinguishing feature can be a face of the animal or human; and when the moving object is a vehicle, the aforementioned distinguishing feature can be a license plate of the vehicle, the above assumptions are examples, and the invention is not limited thereto.

According to the above description, the storage system of original frame of monitor data of the invention may determine a preserving time of each of the original frames OFa according to event intensities of the original frames OFa, and may delete the unpreserved original frames OFa in the corresponding time section. In this way, the storage capacity of the monitor frames can be saved, and effectiveness of the monitor frames in law is maintained.

Figure 3A:
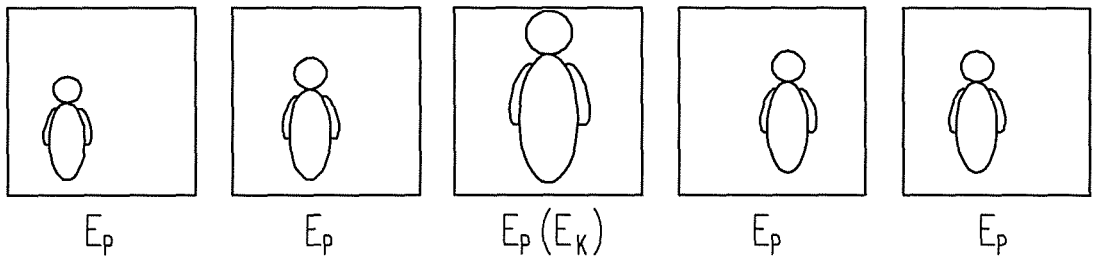
FIG. 3A to FIG. 3C are schematic diagrams of determining original frames according to an embodiment of the invention.
Figure 3B:
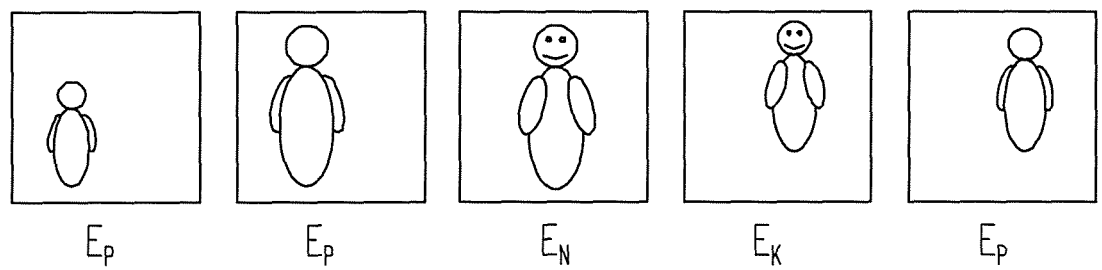
Figure 3C:
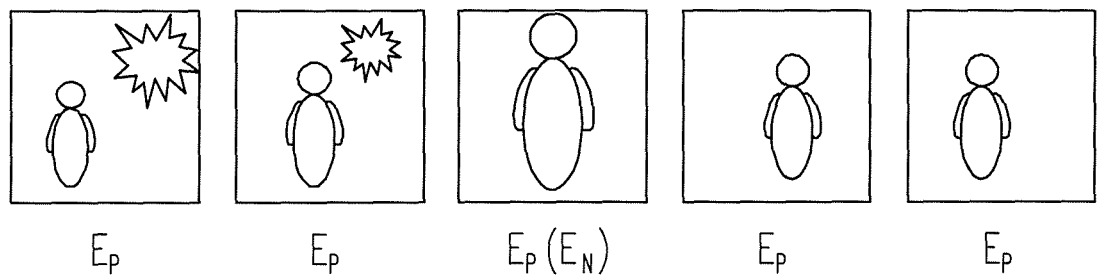

FIG. 3A to FIG. 3C are schematic diagrams of determining the original frames according to an embodiment of the invention. Referring to FIG. 3A, in the present embodiment, it is assumed that the event is that a pedestrian walks by, and the original frames in the event all capture back images of the pedestrian, i.e. the original frames in the event are all general frames $E_P$. When only the general frames $E_P$ exist in the event, the original frames of the event cannot be preserved till the time section TP2, i.e. the preserving time of the original frames of the event is probably too short. In this case, more than one of the original frames of the event can be selected as representatives of a clear back image, and the selected original frames are set as the key frames $E_K$, such that the original frames of the event can be preserved till the time section TP2.

Referring to FIG. 3B, in the present embodiment, it is assumed that the event is that a pedestrian walks by, where the original frame with a human face and with the most clear human face is set as the necessary key frame $E_N$, the original frames with distinguishable human faces are set as the key frames $E_K$, and the original frames only with back images or with too small or blur human faces are set as the general frames $E_P$.

Referring to FIG. 3C, in the present embodiment, it is assumed that the event is that a pedestrian walks by and a specific event occurs (for example, an explosion event), and the original frames in the event all capture back images of the pedestrian, i.e. the original frames in the event are all general frames $E_P$. Due to the occurrence of the explosion event, it represents that the preserving time of the event should be prolonged, and now more than one of the original frames of the event are selected as representatives of a clear back image, and the selected original frames are set as the necessary key frames $E_N$, and the other original frames in the event are still set as the general frames $E_P$.

Figure 4:
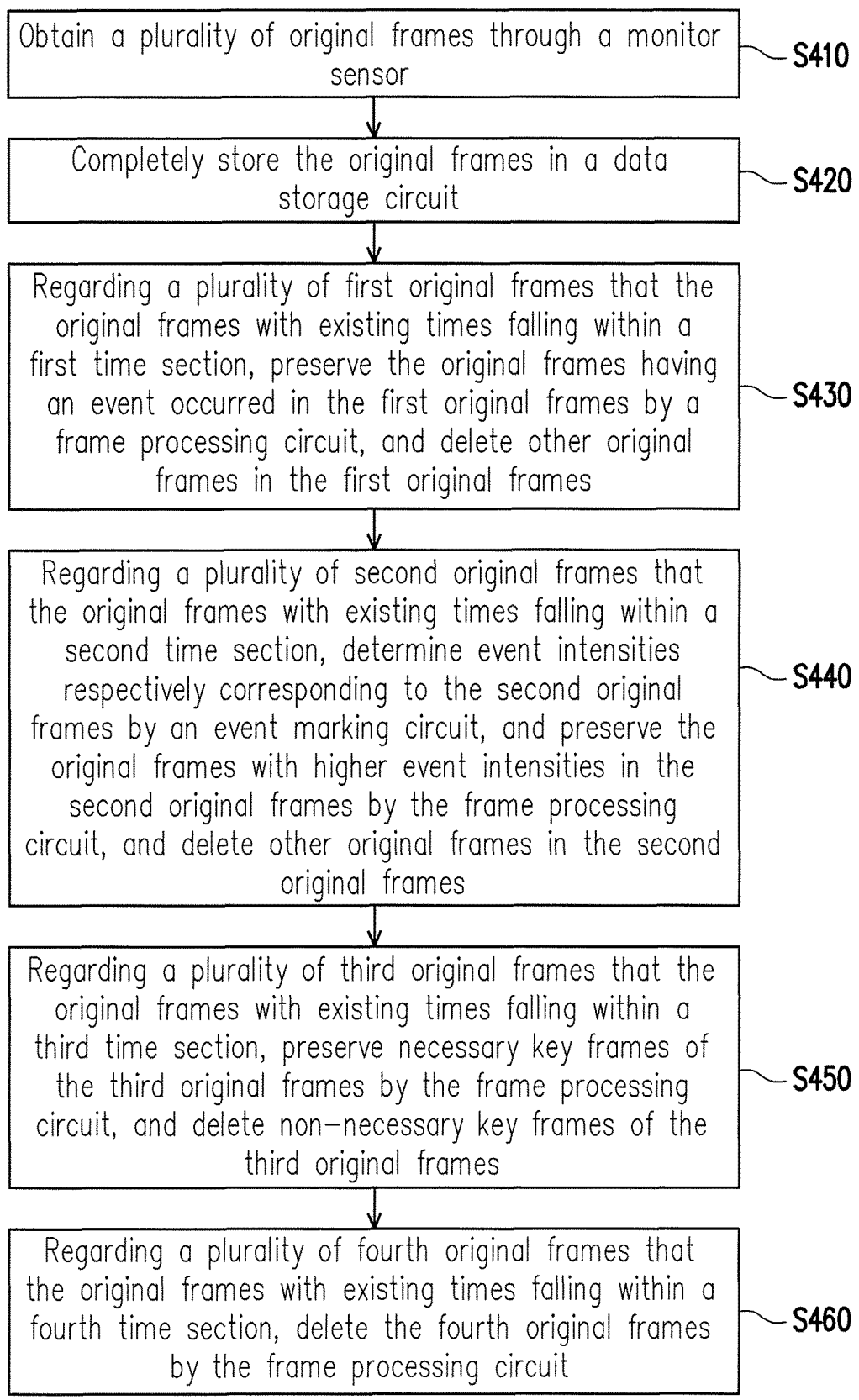
FIG. 4 is a flowchart illustrating a storage method of original frames of monitor data according to an embodiment of the invention.

FIG. 4 is a flowchart illustrating a storage method of original frames of monitor data according to an embodiment of the invention. Referring to FIG. 4, in the present embodiment, the storage method of original frames of monitor data includes following steps. First, a plurality of original frames is obtained through a monitor sensor (step S410), and the original frames are completely stored in a data storage circuit (step S420). Then, regarding a plurality of first original frames that the original frames with existing times falling within a first time section, the original frames having an event occurred in the first original frames are preserved by a frame processing circuit, and other original frames in the first original frames are deleted (step S430).

Regarding a plurality of second original frames that the original frames with the existing times falling within a second time section, event intensities respectively corresponding to the second original frames are determined by an event marking circuit, and the original frames with higher event intensities in the second original frames are preserved by the frame processing circuit, and other original frames in the second original frames are deleted (step S440).

Regarding a plurality of third original frames that the original frames with the existing times falling within a third time section, necessary key frames of the third original frames are preserved by the frame processing circuit, and non-necessary key frames of the third original frames are deleted (step S450). Regarding a plurality of fourth original frames that the original frames with the existing times falling within a fourth time section, the fourth original frames are deleted by the frame processing circuit (step S460). A sequence of the steps S410, S420, S430, S440, S450 and S460 is only an example, and the embodiment of the invention is not limited thereto. Moreover, details of the steps S410, S420, S430, S440, S450 and S460 may refer to the embodiment of FIG. 1 and FIG. 2, which are not repeated.

In summary, in the storage system of original frame of monitor data and a storage method thereof of the invention, the storage system of original frame of monitor data determines a preserving time of each original frame according to event intensities of the original frames, and deletes the unreserved original frames in the corresponding time section. In this way, the storage capacity of the monitor frames is saved, and effectiveness of the monitor frames in law is preserved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A storage system of original frames of monitor data, comprising:
   a monitor sensor, providing a plurality of original frames;
   an event marking circuit, having an input terminal coupled to the monitor sensor, configured to determine event intensities respectively corresponding to the original frames provided by the monitor sensor, and respectively marking the event intensities on the original frames;
   a data storage circuit, coupled to an output terminal of the event marking circuit, and configured to completely store the original frames marked by the event marking circuit; and
   a frame processing circuit, coupled to the data storage circuit, and configured to check the original frames in the data storage circuit according to the event intensities, wherein regarding a plurality of first original frames that the original frames with an existing time falling within a first time section, the frame processing circuit preserves the original frames having an event occurred in the first original frames, and deletes other original frames in the first original frames, and regarding a plurality of second original frames that the original frames with the existing time falling within a second time section, the frame processing circuit preserves the original frames with higher event intensities in the second original frames, and deletes other original frames in the second original frames.

2. The storage system of original frames of monitor data as claimed in claim 1, wherein the second original frames comprise a plurality of key frames, and the frame processing circuit preserves the key frames with higher event intensities in the key frames, and deletes the other key frames.

3. The storage system of original frames of monitor data as claimed in claim 2, wherein the key frames are the original frames comprising a moving object.

4. The storage system of original frames of monitor data as claimed in claim 2, wherein an event intensity of a necessary key frame in the key frames is higher than an event intensity of a non-necessary key frame in the key frames, and the frame processing circuit preserves the necessary key frames in the second original frames, and preserves a part of the non-necessary key frames in the second original frames.

5. The storage system of original frames of monitor data as claimed in claim 4, wherein the event intensities of the non-necessary key frames are proportional to a proportion of a moving object in the corresponding second original frames, and the frame processing circuit preserves the original frames with higher event intensities in the non-necessary key frames.

6. The storage system of original frames of monitor data as claimed in claim 4, wherein the necessary key frame is the original frame comprising a distinguishing feature of a moving object, and the non-necessary key frame is the original frame comprising the moving object without comprising the distinguishing feature.

7. The storage system of original frames of monitor data as claimed in claim 6, wherein when the moving object is an animal, the distinguishing feature is a face of the animal, and when the moving object is a vehicle, the distinguishing feature is a license plate of the vehicle.

8. The storage system of original frames of monitor data as claimed in claim 4, wherein regarding a plurality of third original frames that the original frames with the existing time falling within a third time section, the frame processing circuit preserves necessary key frames of the third original frames, and deletes non-necessary key frames of the third original frames.

9. The storage system of original frames of monitor data as claimed in claim 8, wherein regarding a plurality of fourth original frames that the original frames with the existing time falling within a fourth time section, the frame processing circuit deletes the fourth original frames.

10. The storage system of original frames of monitor data as claimed in claim 1, wherein the event intensity is non-related to time.

11. A storage method of original frames of monitor data, comprising:
    obtaining a plurality of original frames through a monitor sensor;
    completely storing the original frames in a data storage circuit;
    regarding a plurality of first original frames that the original frames with an existing time falling within a first time section, preserving the original frames having an event occurred in the first original frames by a frame processing circuit, and deleting other original frames in the first original frames; and
    regarding a plurality of second original frames that the original frames with the existing time falling within a second time section, determining event intensities respectively corresponding to the second original frames by an event marking circuit, preserving the original frames with higher event intensities in the second original frames by the frame processing circuit, and deleting other original frames in the second original frames.

12. The storage method of original frames of monitor data as claimed in claim 11, wherein the second original frames comprise a plurality of key frames, and the step of preserving the original frames with higher event intensities in the second original frames comprises:
    preserving the key frames with higher event intensities in the key frames by the frame processing circuit, and deleting the other key frames.

13. The storage method of original frames of monitor data as claimed in claim 12, wherein the key frames are the original frames comprising a moving object.

14. The storage method of original frames of monitor data as claimed in claim 12, wherein an event intensity of a necessary key frame in the key frames is higher than an event intensity of a non-necessary key frame in the key frames, and the step of preserving the original frames with higher event intensities in the second original frames comprises:
    preserving the necessary key frames in the second original frames by the frame processing circuit, and preserving a part of the non-necessary key frames in the second original frames.

15. The storage method of original frames of monitor data as claimed in claim 14, wherein the event intensities of the non-necessary key frames are proportional to a proportion of a moving object in the corresponding second original frames, and the step of preserving a part of the non-necessary key frames comprises:
    preserving the original frames with higher event intensities in the non-necessary key frames by the frame processing circuit.

16. The storage method of original frames of monitor data as claimed in claim 14, wherein the necessary key frame is the original frame comprising a distinguishing feature of a moving object, and the non-necessary key frame is the original frame comprising the moving object without comprising the distinguishing feature.

17. The storage method of original frames of monitor data as claimed in claim 16, wherein when the moving object is an animal, the distinguishing feature is a face of the animal, and when the moving object is a vehicle, the distinguishing feature is a license plate of the vehicle.

18. The storage method of original frames of monitor data as claimed in claim 14, further comprising:
    regarding a plurality of third original frames that the original frames with the existing time falling within a third time section, preserving necessary key frames of the third original frames by the frame processing circuit, and deleting non-necessary key frames of the third original frames.

19. The storage method of original frames of monitor data as claimed in claim 18, further comprising:
    regarding a plurality of fourth original frames that the original frames with the existing time falling within a fourth time section, deleting the fourth original frames by the frame processing circuit.

20. The storage method of original frames of monitor data as claimed in claim 11, wherein the event intensity is non-related to time.

* * * * *